United States Patent [19]

Baxley

[11] Patent Number: 4,570,374
[45] Date of Patent: Feb. 18, 1986

[54] FLOATING FISH RECEPTACLE

[76] Inventor: Grover B. Baxley, 1901 Walnut Way, Noblesville, Ind. 46060

[21] Appl. No.: 529,600

[22] Filed: Sep. 6, 1983

[51] Int. Cl.⁴ ............................................ A01K 97/04
[52] U.S. Cl. ....................................................... 43/55
[58] Field of Search .................................. 43/55, 54.1

[56] References Cited

U.S. PATENT DOCUMENTS

| 153,855 | 8/1874 | Slawson . | |
|---------|--------|-----------|------|
| 2,241,314 | 5/1941 | Mohler | 43/55 |
| 3,478,463 | 11/1969 | Ruter | 43/55 |
| 3,559,329 | 2/1971 | Chiu | 43/55 |
| 3,919,803 | 11/1975 | Manguso | 43/55 |
| 4,070,786 | 1/1978 | Dunham | 43/55 |
| 4,251,943 | 2/1981 | Sawlsville | 43/55 |

Primary Examiner—Gene P. Crosby
Attorney, Agent, or Firm—Woodard, Weikart, Emhardt & Naughton

[57] ABSTRACT

A floating fish receptacle for retaining caught fish in a live condition under water includes a molded foam, generally cylindrical housing member which includes as part thereof in unitary construction a floatation collar outwardly extending from the outside diameter surface and a pair of baffle members inwardly extending from the inside surface. The baffle members are arranged in an axially (vertically) separated relationship and are radially spaced 180° apart so as to create a zig zag slide action for fish which are dropped through the top opening of the housing. As the fish enters, it strikes one downwardly and inwardly inclined surface of one baffle member and then is transferred to the corresponding surface of the other baffle member and then on through to a mesh bag which is suspended therebelow for retention of the fish. The top opening of the housing is above the water level while the opposite and lower opening of the housing member is below the water level. The mesh bag is secured around this lower opening so as to insure that the mesh bag is below water at all times that fish are stored therein. The baffle members are removable from the main housing as is the mesh bag. Consequently, the main housing member may be used in combination with the mesh bag without the baffle members and the mesh bag may be used independently of the housing member.

14 Claims, 12 Drawing Figures

U.S. Patent  Feb. 18, 1986  Sheet 1 of 2  4,570,374
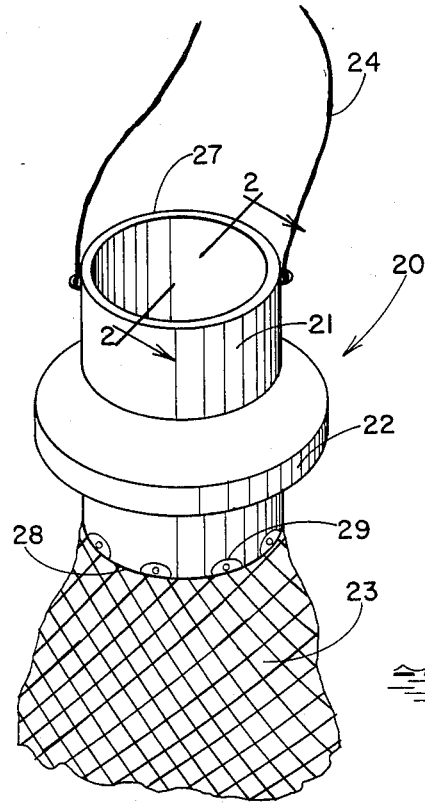
FIG. 1
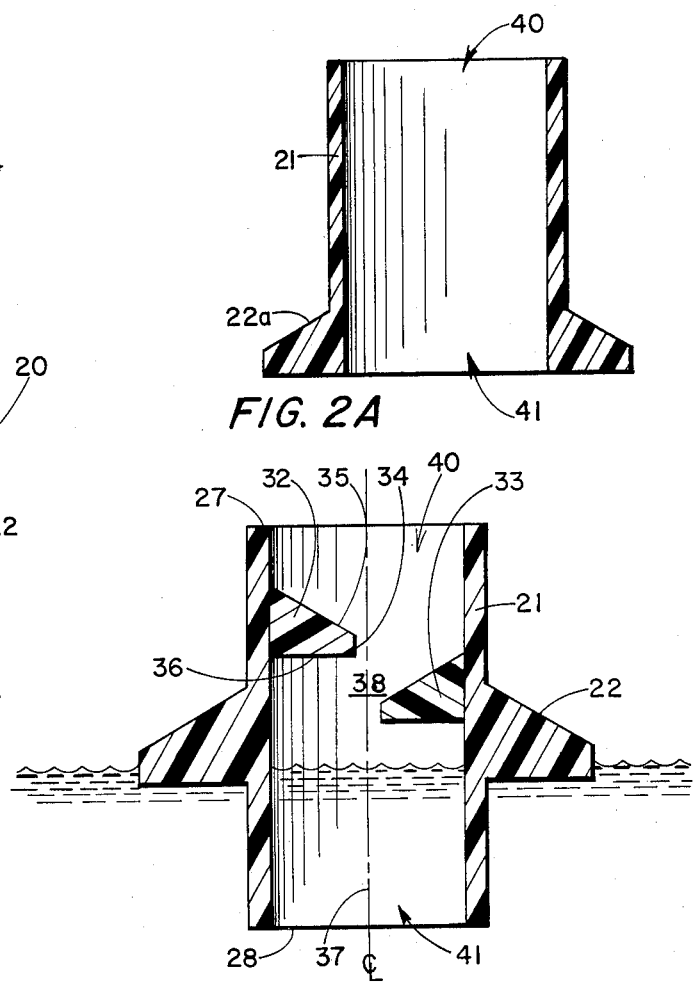
FIG. 2A
FIG. 2
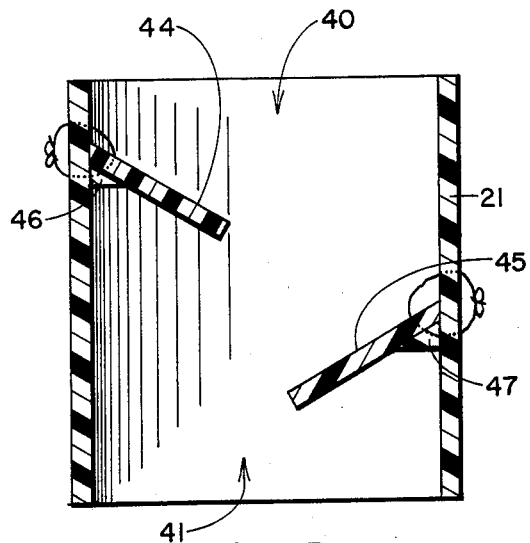
FIG. 3
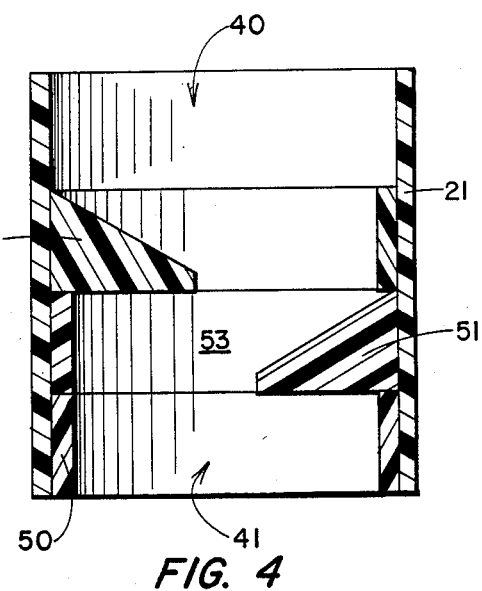
FIG. 4

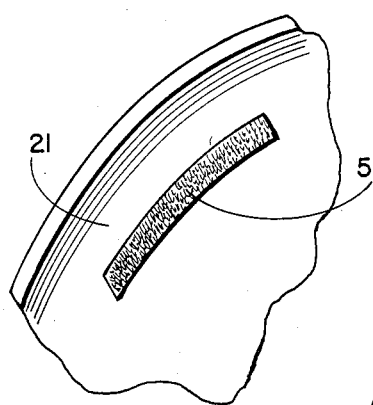
FIG. 5
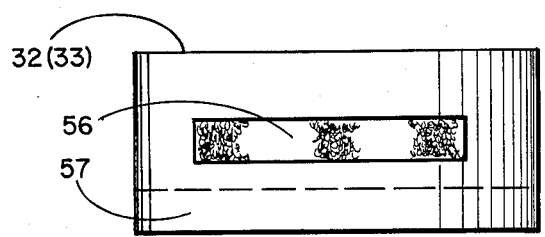
FIG. 6
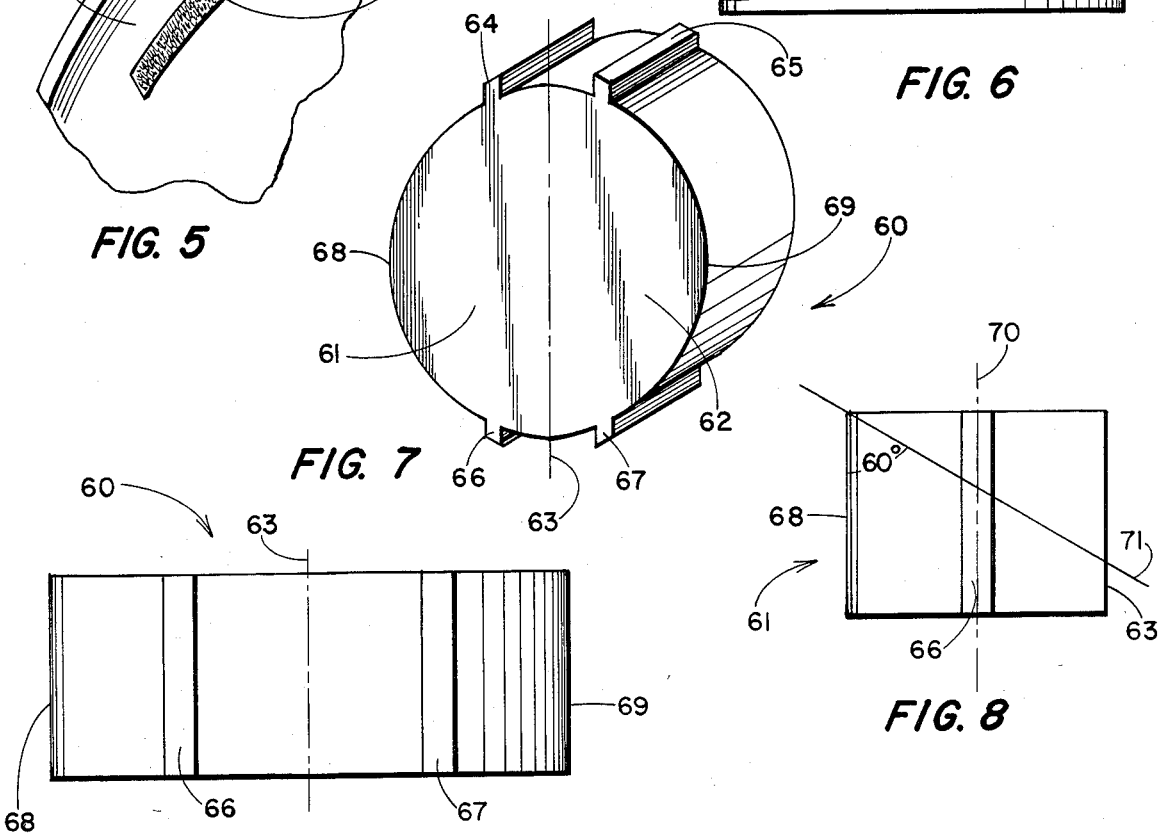
FIG. 7
FIG. 7A
FIG. 8
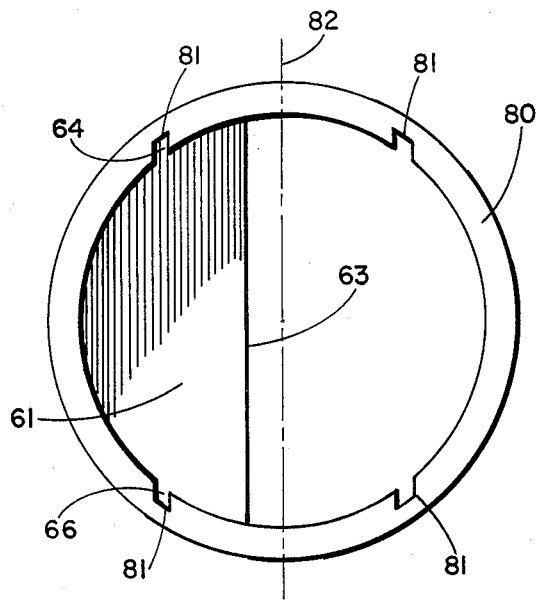
FIG. 9
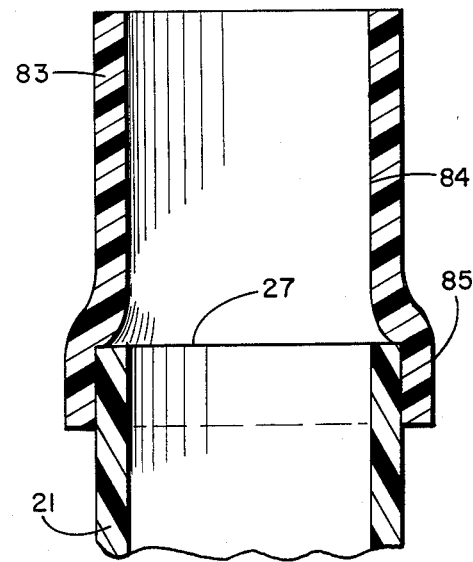
FIG. 10

FLOATING FISH RECEPTACLE

BACKGROUND OF THE INVENTION

This invention relates in general to fishing accessories and in particular to receptacles for keeping caught fish alive while the individual continues fishing.

As most fishermen are aware, the longer caught fish can be kept alive prior to cooking or fast freezing, the fresher they remain and the better they taste. One approach to keeping caught fish alive longer is to keep them in water, preferably the same water from where they were caught. While conventional cord and metal clip stringers permit a caught fish to be returned to the same water, the interference with the fish's gills and mouth by such devices typically result in the fish dying, sometimes very shortly after being returned to the water. The addition of other fish to the stringer accelerates this process.

Receptacles for storing caught fish which must be worn by the fisherman are not an acceptable alternative. For example, one concern with such receptacles is their weight. A creel represents one type of receptacle which, initially at least, is light in weight. However, this type of receptacle will not retain water and as more fish are added to the storage portion, the weight increases to a point that it may become a concern. Devices such as a creel may also prove unacceptable as the physical size of this type of receptacle interferes with casting motion and general mobility of the fisherman.

In hopes of overcoming some of the foregoing drawbacks to other approaches, floating fish baskets have been conceived. The following listed references are believed to be somewhat typical of the designs of such baskets:

| U.S. Pat. No. | Patentee |
| --- | --- |
| 3,478,463 | Ruter |
| 3,919,803 | Manguso |
| 2,241,314 | Mohler |
| 3,559,329 | Chiu |
| 4,070,786 | Dunham |

Ruter discloses a floating fish basket wherein a floatation member has suspended from it a tapering portion which extends into a fish-receiving portion. The top opening through which the fish are placed is recessed within the surrounding floatation member and comprises a spring-loaded mesh cover which must be pushed downwardly in order to insert the fish into the receptacle. This opening for the fish to be inserted into the receptacle is generally flush with the water level. Consequently in order to insert a fish into this type of receptacle, the fish must be lowered very close to the water level resulting in the subsequent risk that the fish may squirm or jump free from the grasp of the fisherman and return to the water. There is also some concern that if the boat is substantially above the water level that the fisherman may be subjected to a very awkward twist or contortion in order to bend over a sufficient degree in order to place the fish into the receptacle.

Manguso discloses a buoyant fish basket whose construction is very similar to that disclosed by the Ruter reference. Although there are some differences, Manguso includes a generally ring-like floatation member the opening of which is covered with a hinged flap or cover and suspended from around the floatation member is a mesh or screen-type of receptacle. The device further includes a rope for suspension and retention of this device on the edge of a boat, although as previously mentioned, the opening to the basket or receptacle portion is disposed substantially flush with the water line.

Mohler discloses a fish bag wherein a generally annular ring floatation member has suspended therefrom a mesh bag very similar in design and theory to both the Ruter and Manguso disclosures. The only variation seen by the Mohler reference is the fact that the floatation member is inflatable by means of an inflation valve and the opening for the fish to be inserted is a diametrical slit in a rubber diaphragm which covers the opening on the interior of the floatation member. Again though, the fish must be lowered to the water level in order to be placed within the receptacle thus incurring the two aforementioned risks of either losing the fish or contorting the fisherman to an unacceptable or uncomfortable degree.

Chiu discloses a bag with a one-way entrance, and although this particular reference may have some relevance to the present invention, it is basically the disclosure of a creel similar to what trout fisherman, for example, may use. The reference focuses primarily on the design of the inlet which is a funnel-shaped opening which is enabled to expand as the fish slides through from the larger top open end to the smaller tapered closed end. The obvious advantage of this type of design is to prevent the fish from jumping back up through the opening and escaping. However, this particular bag design is not configured with floatation means nor is it suitable to retain water thus not fulfilling one very important purpose of the present invention, that being to keep the fish alive.

Dunham discloses a fish-receiving hopper which is similar in style to the live well or other fish storage container which may be included as part of the boat. Such live wells are typically disposed in the hull of the boat and are filled with water from the surrounding lake or stream. As fish are caught, they are simply tossed into this live well where they remain until the fisherman returns to shore and empties the live well. While the device disclosed in Dunham may have a number of benefits to certain types of fisherman and certain types of situations, it is not configured as a floating fish basket and is not suitable to accompany a fisherman regardless of whether that fisherman is wading in a stream or brook or in a boat, or on shore. One advantage with the present invention which is not found in a device such as that disclosed by the Dunham patent is that the present invention can easily move with the fisherman, regardless of where the fisherman goes.

What is quite clear from a careful review of each of the first three patent disclosures is the device has a top floatation ring below which a fish receptacle is disposed. As a result, the entrance opening for the fish is at or very near the water level. One problem created by this approach is that the fish must be lowered from the boat height down to the water. Not only is this physically awkward for the fisherman, but risky due to the squirming and slippery nature of most fish. The particular physical arrangement of the boat may require that the fisherman brace himself with one hand while he leans over toward the water level thus allowing the fish to be held by only one hand, thereby increasing the risk that the fish may squirm loose.

The Chiu and Dunham references are not floating receptacles and are mentioned only for their disclosure of means to make an inlet opening unidirectional. The one-way entrance of Chiu and the door of Dunham are probably acceptable as inlet covers, but they are not of a preferred design because these types of inlet covers must be pushed open using the fish as a poker. This need for additional handling and manipulation of the fish is believed to be a disadvantage and one which could be avoided by a continuously open inlet which is "guarded" by baffles as found in the present invention. A continuously open inlet enables the fish to merely be dropped in, thereby avoiding the necessity to use the fish as a poker to push through the hinged and closed opening.

Baffles used as slides are found in U.S. Pat. No. 153,855 which issued to Slawson on Aug. 4, 1874. However, the slides of Slawson are specifically designed to overlap with narrow clearance therebetween. This is a design which is unacceptable as a fish receptacle, not only from the slide design, but as well for the remainder of the device and its particular construction.

Further benefits (improvements) found in the present invention and which distinguish this invention from any prior art designs now known, are embodied in part in the baffle design of the present invention, the removable nature of those baffles, the location of the floatation collar relative to the inlet opening and the ability to quickly and easily alter the design for other uses such as shelling, scalloping or claim digging.

SUMMARY OF THE INVENTION

A floating fish receptacle for retaining caught fish in a live condition under water according to one embodiment of the present invention comprises a housing member having two opposite ends and being open at both ends, floatation means associated with the housing member for retaining the receptacle in a generally upright condition with one of its open ends above the water level and its opposite end submerged below the water level, a fish-retaining receptacle portion removably secured to the housing member and enclosing the submerged end of the housing member, vertically spaced baffle members disposed within the housing member and extending inwardly therefrom, the baffle members each having an innermost edge wherein the edges define a clearance space therebetween sufficient to allow a fish to pass from one baffle plate to the other and into a fish-retaining receptacle.

One object of the present invention is to provide an improved floating fish receptacle.

Related objects and advantages of the present invention will be apparent from the following description.

BRIEF DESCRIPTION OF THE DRAWINGS

FIG. 1 is a perspective view of a floating fish receptacle according to a typical embodiment of the present invention.

FIG. 2 is a front elevation view in full section of the floatation portion of the FIG. 1 receptacle.

FIG. 2A is an alternative form for the floatation portion comprising a portion of the FIG. 1 floating fish receptacle.

FIG. 3 is a schematic illustration of an alternate baffle plate design suitable for use as part of the FIG. 1 receptacle.

FIG. 4 is a schematic illustration of yet another baffle plate design suitable for use as part of the FIG. 1 receptacle.

FIG. 5 is a perspective view of one-half of a fastening means suitable for use in securing baffle plates within the interior of the floatation means and comprising a portion of the FIG. 1 receptacle.

FIG. 6 is a perspective view of the other half of the FIG. 5 fastening means.

FIGS. 7 and 7A represent perspective and front elevation views, respectively, in schematic form, of a molded foam core which is machinable into suitable baffle plates for use with the FIG. 1 receptacle.

FIG. 8 is a schematic illustration of one machining cut necessary in order to convert the FIGS. 7 and 7A foam core into a baffle plate member.

FIG. 9 is a top plan view illustrating one baffle plate member installed in a cylindrical housing suitable for use as the floatation means with the FIG. 1 receptacle.

FIG. 10 is a front elevation view in full section of an adapter suitable for use as an accessory to the FIG. 1 receptacle.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a floating fish receptacle 20 which includes a generally cylindrical housing member 21, a floatation collar 22, mesh bag 23 and carrying strap 24.

As will be described more fully hereinafter, housing member 21 may take on a variety of shapes and dimensions, although it is felt that the preferred configuration is to construct this portion of the invention as a generally cylindrical member from a lightweight plastic or styrofoam type of material having a specific gravity of less than one. Floatation collar 22 may be disposed at a variety of axial heights between top edge 27 and bottom edge 28. As should be understood, housing member 21 is open at both ends and mesh bag 23 is securely fastened around bottom edge 28. FIGS. 2 and 2A illustrate two of many possible positions for floatation collar 22 which is denoted in FIG. 2 as floatation collar 22 in that FIG. 2 is a full section view of the housing member of FIG. 1. However, in FIG. 2A, the alternative floatation collar location is denoted as collar 22a.

In the exemplary embodiment, floatation collar 22 is formed of a unitary construction with housing member 21 as is illustrated in FIG. 2. Alternatively, the collar can be separately molded and thereafter positioned on and secured to the housing member. The material disclosed is a synthetic material, preferably an open or closed cell foam, such as styrofoam. This material provides the floatation to the housing member in combination with the floatation collar, and the axial height of the floatation collar relative to the remainder of the housing member will be discussed hereinafter. Mesh bag 23 is assembled around the bottom edge 28 by a plurality of snaps 29, although other attachment means are envisioned such as a drawstring, Velcro ® fasteners, and hooks. Carrying strap 24 provides a means by which the floating fish receptacle 20 may be carried by the fisherman, suspended from a boat or dock, or simply pulled along by the fisherman as he wades through a stream or brook.

Although collar 22 is designed to provide floating stability to the housing member 21, it may be omitted by permitting the housing member to serve as the means of floatation. In this alternate embodiment, the housing member must be fabricated of a material such as styrofoam. When the floatation collar is used, the housing material need not be capable of floating.

Referring to FIG. 2, baffle members 32 and 33 are illustrated as being disposed on the inner surface of housing member 21 and each is configured with an innermost edge 34, a downwardly inclined slide or sloping surface 35 and a substantially flat and horizontal undersurface 36. Due to the variety of baffle designs and for drawing clarity, baffle members are not illustrated in FIG. 1. As should be understood, the inner edge 34 of each baffle member represents the innermost extension of the baffle member from the inside diameter surface of the housing member inwardly toward centerline 37. These facing inner edges are spaced apart from one another a distance of approximately three inches. Further, the two baffle members 32 and 33 are axially spaced such that there is a passage space 38 between them of several inches, more than enough for a medium-to-large fish to slide through. Sloping surface 35 has a downwardly and inwardly directed slope of approximately 60°, that being the underside and included angle relative to the vertical line of the inside surface of housing member 21. Top edge 27 defines a top open end 40 for the housing member and bottom edge 28 defines an opposite bottom open end 41.

As should be understood, when a caught fish is dropped into top open end 40, its general size will likely result in baffle member 32 being struck by a portion of the fish thereby directing the fish both downwardly and in the direction of baffle member 33. Upon striking the top inclined surface of baffle member 33, the fish will then slide back in the other direction passing through space 38 and proceeding to pass through bottom open end 41 into mesh bag 23.

Although the weight of the floating fish receptacle will determine how far down into the water it will sink, the mass of the floatation collar 22 results in that floatation collar being at or near the water line. Consequently, the portion of housing member 21 which is below the floatation collar will be submerged while that portion above the floatation collar will be above the water level. The higher the top portion which extends above the water level, the closer top open end 40 will be to the fisherman or to the top edge of the boat. Of course, there may be a limitation as to how much above water mass can be accommodated without the receptacle tipping, but as is clearly evident, top open end is substantially above the water line thereby increasing the ease for the fisherman of inserting a fish into the receptacle. By increasing the outside diameter size of the collar greater floatation stability can be achieved thereby enabling a higher extension of the housing member. A further enhancement to the deposit of a caught fish into the receptacle is provided by the fact that there are no obstructions, covers, lids or similar means encumbering top open end 40. The fisherman merely needs to drop the fish into the opening at which point the fish will slide from one baffle to the other and then ultimately be deposited within the mesh bag where it can be retained in the water from which the fish was caught until such time that the fisherman is through and the fish are to be cleaned and either frozen or cooked.

An alternative placement of floatation collar 22 is illustrating FIG. 2A wherein floatation collar 22a is disposed about bottom open end 41. In this configuration, there is technically no generally cylindrical portion of housing member 21 which extends below the floatation collar. Consequently, the attachment of the mesh bag must be slightly modified over that illustrated in FIG. 1. In this arrangement, it is envisioned that the mesh bag would fit up and over the floatation collar such that the increased diameter size of the floatation collar would assist in holding the mesh bag around the housing member. In this particular arrangement, snaps or Velcro fasteners could be used although a drawstring is believed preferred. With any of these approaches as to the attachment of the mesh bag to the remainder of the floating fish receptacle, it is to be understood that the mesh bag may be removed and used separately for such activities as shelling, scalloping or clam digging. When these alternative uses for the mesh bag are contemplated, it is felt preferred to use the drawstring method of assembly of the mesh bag to the floating fish receptacle.

By providing the drawstring approach for the assembly of the mesh bag to the remainder receptacle, the drawstring may be used both as a carrying means of the mesh bag when it is used separately as well as a closure means so as to keep the contents of the bag from spilling or slipping out.

Referring to FIGS. 3 and 4, alternative baffle member designs are illustrated in combination with a generally cylindrical and representative housing member 21. In FIG. 3, hard plastic baffle members 44 and 45 are configured as generally flat plates of suitable thickness so as to withstand the impact of the fish as it hits and bounces from one to the other as it slides through from top open end 40 to bottom open end 41. While there are a variety of assembly approaches, the one illustrated by the exemplary embodiment, is to provide a wedge member 46 and 47, respectively, directly below the baffle members and adjacent the inside surface of the housing member. This provides additional surface area for bonding these baffle members to the side wall of the housing member. These baffle plates are wired in place or alternatively tied in place through and to the side wall of the housing member 21, in which case wedges 46 and 47 establish the proper angular orientation and maintain the baffle members in that orientation so a proper slide action occurs with regard to the fish that is dropped through top open end 40.

Referring to FIG. 4, a slightly different approach to the design of the baffle members is illustrated wherein an annular support lip 50 is rigidly secured to the inside diameter surface of housing member 21. Thereafter, first baffle member 51 is pressed in place until its lower edge comes to rest against the top edge of lip 50. In this regard, the outside diameter of baffle member 51 is closely toleranced to the inside diameter size of housing member 21 such that the fit is snug and rigid. As is to be understood, baffle member 51 is a generally cylindrical solid or disc-like member wherein an opening 53 has been cut such that there is a clearance or passage zone through which the fish may pass. Baffle member 52 which similarly is pressed into place directly atop baffle member 51 is similarly styled like member 51, although indexed or rotated 180° from the orientation of baffle member 51. Baffle member 52 also has an open portion and the angular baffle surfaces of each baffle are cut at approximately 60°. Each baffle member 51 and 52 has an appearance very similar to that illustrated in FIG. 2 with the exception that each member is generally cylindrical wherein the portion surrounding the more solid area of the baffle member is merely a supporting annular ring or lip, the majority of the cylinder being removed for passage of the fish. Baffles 51 and 52 are removable thus enabling the device to be used as a storage container for other objects.

Referring to FIGS. 5 and 6, Velcro ® fastening means are illustrated wherein a strip 55 of hook-like projections is disposed on the inside surface of housing member 21. The complementing piece is arranged with a plurality of loop-like projections on a strip 56 which is rigidly secured to the outermost and vertical surface 57 of baffle member 32 or 33. As should be understood, inasmuch as housing member 21 is of a generally cylindrical shape throughout, baffle members 32 and 33 will have a part-cylindrical curved surface disposed adjacent the inside diameter surface of the housing member. This part-cylindrical surface is illustrated as surface 57 in FIG. 6. Consequently, the two strips 55 and 56 of the hook-like projections and loop-like projections are configured in an arcuate manner. As these two strips are pushed into contact with each other, baffle members 32 and 33 are rigidly secured to the inside diameter surface of housing member 21. The holding power of this attachment concept is directly related to the surface area provided by strips 55 and 56, and thus this size is selected so as to be compatible with the anticipated size and weight of fish to be caught and retained in a floating fish receptacle according to the present invention.

An alternative attachment concept for the baffle members 32 and 33 to the interior cylindrical surface of housing member 21 is to replace the Velcro ® strips 55 and 56 with snaps. The desire with regard to the removability of the baffle members is to enable replacement of those members if they become damaged. Removability may also be desired in the event the floating fish receptacle is used for some other purpose such as shelling, scalloping or clam digging. While these other activities may employ merely the mesh bag as a receptacle, it is also envisioned that the user may be wading in water and wish to have the receptacle float with him as he moves through the water. In this regard, the floatation collar and housing member will be retained with the mesh bag attached thereto as previously described. In order to avoid any impacting which may not be desired, such as with shelling, the baffle members can be removed by pulling them apart from the inside surface of the housing member.

Referring to FIGS. 7, 7A, 8 and 9, one envisioned molding and machining approach for construction of suitable baffle members is disclosed. This method of manufacture also provides a novel attachment concept which precludes the need for Velcro ® strips, snaps, or similar devices while still enabling the resulting baffle members to be easily installed and removed from the housing member. Beginning with FIG. 7, what is disclosed in schematic form is a single-piece foam core 60 consisting of two part-cylindrical portions 61 and 62 whose inside substantially flat surfaces abut one another at parting line 63. As will later be understood, each part-cylindrical portion 61 and 62 is not a full half cylinder (equal to 180°), but is slightly short of that as is illustrate in FIG. 9. Foam core 60 is molded as a unitary piece and includes four ribs 64–67. Ribs 64 and 66 are aligned with one another and their vertical centerline according to the FIG. 7 orientation is equally spaced between parting line 63 and outermost point 68, although other locations are clearly possible. Similarly, ribs 65 and 67 are aligned with one another and their vertical centerline is equally spaced between parting line 63 and outermost surface 69. This relationship is further illustrated in FIG. 7A which is a side elevation view of the FIG. 7 foam core.

In order to create suitable baffle members from foam core 60 after it is molded into the unitary construction illustrated in FIG. 7, it is first necessary to make one saw cut completely through the foam core following parting line 63. What results is one part-cylindrical portion with two ribs, one on each side as is best illustrated in FIG. 8. As was previously described, the vertical centerline 70 for rib 66 is equally spaced between outermost point 68 and parting line 63. Line 71 represents a cutting line through portion 61 such that what is left after a cut is made along line 71 is a baffle member having a part-cylindrical curved surface on one side, a substantially flat base on the bottom, a substantially flat tapered edge on the inside and an inclined top surface of approximately 60°. Also included on this baffle member are two aligned ribs 66 and 64 which are used as keys for insertion of the baffle member into the housing member. Referring now to FIG. 9, a slightly modified housing member 80 is illustrated as a generally cylindrical foam member having a plurality of keyway slots 81 molded therein. By arranging each keyway slot in alignment with its corresponding opposite slot and by placing them at appropriate locations to be compatible with the placement of ribs on the foam baffle, it should be understood that part-cylindrical portion 61 which now represents a machined baffle member may be vertically inserted into the interior of the housing member 80 such that the outer curved surface of portion 61 is compatible with the curvature of the inside diameter surface of the housing member and whereby ribs 64 and 66 snugly fit within slot 81 on one side and slot 81 on the opposite side. By having configured part-cylindrical portion 61 at a radial extension of less than 180°, parting line 63 will not extend to cylindrical centerline 82, and once a second baffle member is inserted on the opposite side of centerline 82, the requisite spacing between baffle members is maintained. In order to properly position this type of baffle member at it proper axial height, assuming that slots 81 extend the full length of housing member 80, filler strips are inserted into these slots to allow the baffle members to abut against them at the proper axial height. An alternative approach to the use of the filler strips is to simply terminate the slots 81 at the proper vertical height as part of the molding process or foaming procedure for housing member 80. It is to be understood that with the exception of the slots and the placing of the baffle members into the interior opening, housing member 80 is substantially the same as housing member 21 and is suitably adapted to combine with the mesh bag, floatation collar and carrying strap as previously disclosed as comprising a part of the present invention.

Referring to FIG. 10, there is illustrated an adapter 83 which has a first diameter portion 84 and a larger outwardly flared diameter portion 85. This outwardly flared portion has an inside diameter surface which is substantially the same, albeit slightly larger, than the outside diameter surface of housing member 21. Due to the flared design which actually provides an abutment interior lip as part of adapter 83, adapter 83 is able to press onto the top edge 27 of housing member 21 where it is securely retained and it provides a height extension for those circumstances where tipping of the receptacle is not a problem and the user desires to have the top opening for the insertion of fish at a greater axial height so as to be either closer to the fisherman or higher with respect to the edge of the boat.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A floating receptacle adapted to retain caught fish in a live condition under water, said floating receptacle comprising:
    a housing member including an outer surface and an inner surface, and having two oppositely disposed, open ends, said inner surface defining an interior passageway between said open ends;
    a floatation collar secured to the outer surface of said housing for retaining said receptacle in a generally upright condition with a first one of said open ends above the water level and the second and opposite open end submerged below the water level, said flotation collar extending radially outward from said housing member;
    a fish-retaining member detachably secured to said housing member and enclosing said submerged end of said housing member; and
    vertically spaced baffle members attached to the interior surface of said housing member and extending inwardly therefrom, said baffle members each having an innermost edge, said edges being spaced sufficiently from each other so as to permit the passage of a fish therethrough from said first open end through said passageway and out through said second open end into said fish-retaining member.

2. The floating fish container according to claim 1 wherein said housing member is generally cylindrical.

3. The floating fish container according to claim 2 in which said baffle members are tilted downwardly at an angle of approximately 60° relative to the adjacent surface of said housing member.

4. The floating fish container according to claim 1 wherein said floatation collar encircles the lowermost portion of said housing member and is constructed of a material having a specific gravity of less than one.

5. A floating receptacle adapted to retain caught fish in a live condition under water, said floating receptacle comprising:
    a housing member having two opposite ends and being open at both ends;
    flotation means associated with said housing for retaining said receptacle in generally upright condition with one of its open ends above the water level and its opposite end submerged below the water level;
    a fish-retaining member removably secured to said housing member and enclosing said submerged end of said housing member;
    vertically spaced and removable baffle members disposed within said housing member and extending inwardly therefrom, said baffle members each having an innermost edge, said edges being spaced sufficiently from each other so as to permit the passage of a fish therethrough from one of said open ends through to the other, opposite open end, said baffle members including key ribs and said housing member including complementing slots such that said baffle members assemble to said housing member in a keyed fashion.

6. The floating receptacle of claim 1 wherein said fish-retaining member is selectively separable from said receptacle and suitable for use as an independent container.

7. A floating receptacle adapted to retain caught fish in a live condition under water, said floating receptacle comprising:
    a unitary and integral housing member including an enclosing wall which defines a central opening, said enclosing wall having two oppositely disposed, open ends, a floatation collar radially extending outwardly from said enclosing wall for retaining said receptacle in a generally upright condition with a first one of said open ends above the water level and the second and opposite open end submerged below the water level, and vertically spaced baffle members secured to said housing member and extending inwardly from said enclosing wall into said central opening, said baffle members each having an innermost edge, said edges being spaced sufficiently from each other so as to permit the passage of a fish therethrough from said first open end through said central opening and then through said second open end; and
    a fish-retaining member detachably secured to said housing member and suitably arranged so as to enclose the second open end of said housing member.

8. The floating fish container according to claim 7 wherein said housing member is generally cylindrical.

9. The floating fish container according to claim 7 in which said baffle members are tilted downwardly at an angle of approximately 60° relative to the adjacent surface of said housing member.

10. The floating fish container according to claim 7 wherein said floatation collar encircles the lower end of said housing member and is constructed of a material having a specific gravity of less than one.

11. A floating receptacle adapted to retain caught fish in a live condition under water, said floating receptacle comprising:
    a unitary and integral housing member including an enclosing wall which defines a central opening, said enclosing wall having two oppositely disposed, open ends, a floatation collar disposed adjacent the lowermost edge of said housing member and radially extending outwardly therefrom said enclosing wall for retaining said receptacle in a generally upright condition with a first one of said open ends above the water level and the second and opposite open end submerged below the water level, and vertically spaced baffle members disposed within said housing member and extending inwardly from said enclosing wall into said central opening, said baffle members each having an innermost edge, said edges being spaced sufficiently from each other so as to permit the passage of a fish therethrough from said first open end through said central opening and then through said second open end; and a flexible, mesh bag suitably designed and arranged to receive and retain fish therein, said bag having an opening controlled by a drawstring extending therearound, said bag being detachably secured around said housing member at a location above said floatation collar whereby the increased radial extent of said flotation collar relative to said enclosing wall assists in retaining said bag in position.

12. The floating fish receptacle of claim 11 wherein said housing member is generally cylindrical.

13. The floating fish receptacle of claim 11 wherein said baffle members are tilted downwardly at an angle of approximately 60° relative to the adjacent surface of said housing member.

14. The floating fish receptacle of claim 11 wherein said housing member being constructed of a material having a specific gravity of less than one.

* * * * *